June 12, 1956 G. PATTANTYUS-ABRAHAM 2,750,248
NAVIGATIONAL APPARATUS
Filed Sept. 14, 1953 2 Sheets-Sheet 1
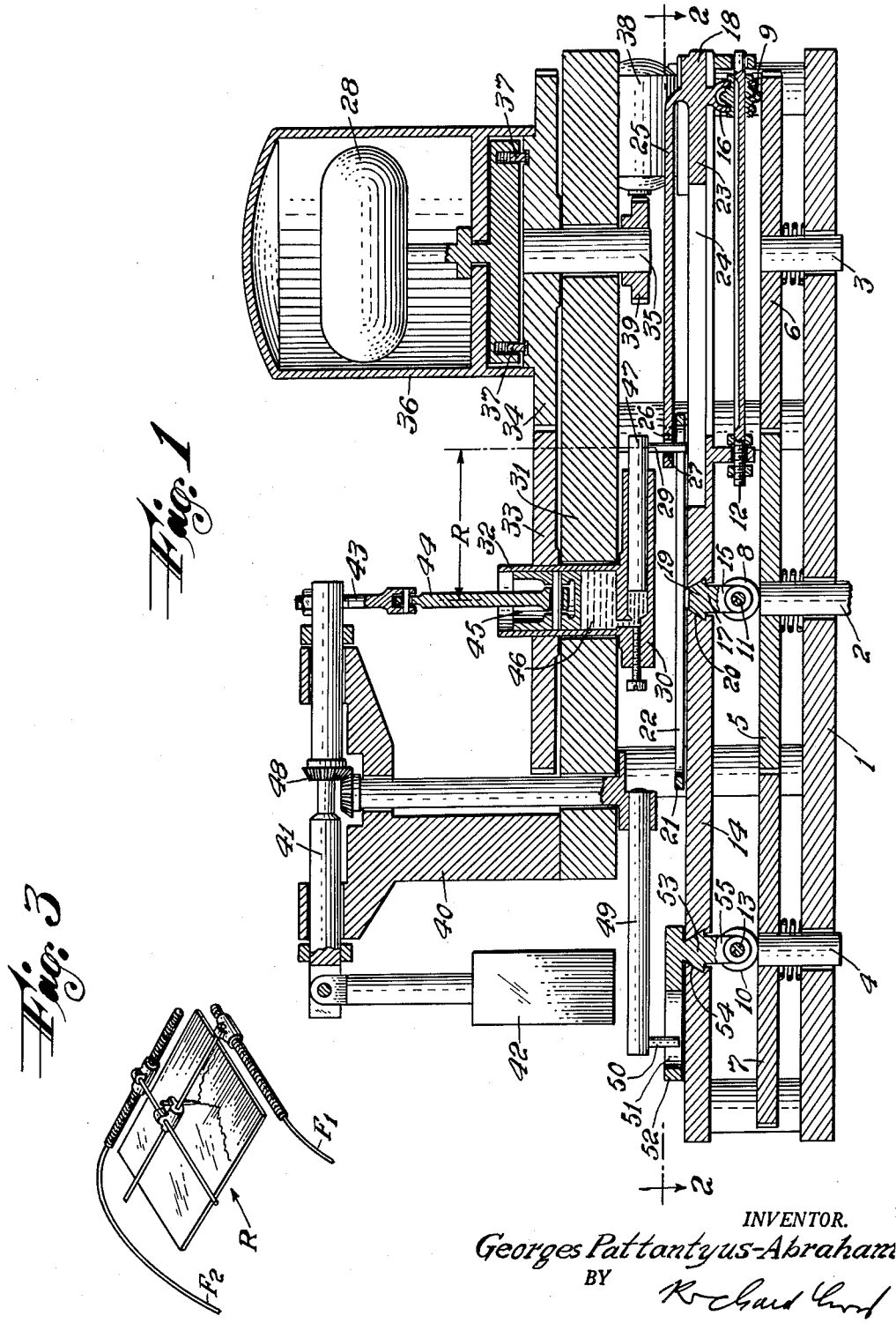
INVENTOR.
Georges Pattantyus-Abraham
BY
Richard Curd
AG'T

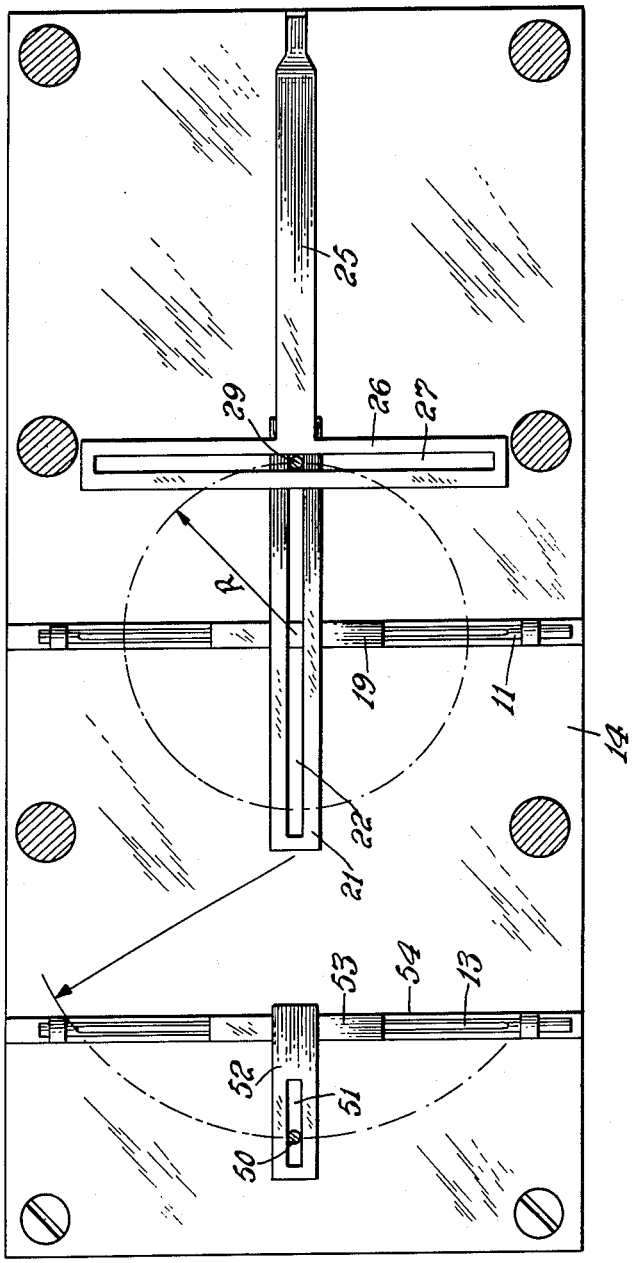

United States Patent Office 2,750,248
Patented June 12, 1956

2,750,248

NAVIGATIONAL APPARATUS

Georges Pattantyus-Abraham, Lisbon, Portugal

Application September 14, 1953, Serial No. 379,884

Claims priority, application Germany September 15, 1952

4 Claims. (Cl. 346—8)

The present invention relates generally to navigational apparatus, and is particularly directed to an improved device for driving conventional mechanisms effective to record, register or plot the path of travel of a wheeled vehicle.

Apparatus for recording, registering or plotting the path of travel of a wheeled vehicle includes a recording, registering or plotting section and a driving section acting in response to the movement of the vehicle and mechanically connected to the recording section, as by flexible shafts, to drive the latter, and the present invention relates specifically to the driving section for association in the usual manner with conventional and suitably calibrated recording, registering or plotting devices.

There are many different kinds of apparatus, known as course-crossline geographical recorders, for determining the position of moving bodies. The main purpose of such course- or crossline geographical recorders is the two-dimensional registering and recording of the path of travel of a moving body, for instance a vehicle, relative to a system or ordinates and coordinates, for example, north-south and east-west. In such recorders, various devices have been employed for driving the registering or recording section, including devices responding to the rotation of the vehicle wheels combined with turning of the steering column. However, all of the existing devices have been inaccurate or insufficient for other reasons.

An object of the invention is to provide a device for driving means effective to record or register two-dimensionally the three-dimensional path of travel of a wheeled vehicle, and wherein the device compensates for departure of the vehicle from the flat, two-dimensional recording plane.

Another object is to provide a device of the described character which is effective to drive means for recording or registering the varying altitude of a wheeled vehicle while simultaneously driving means for recording or registering the path of travel of the vehicle projected onto a horizontal plane.

In accordance with the present invention, the driving section of apparatus of the described character includes several discs rotated by direct transmission from one of the wheels of the vehicle or by a differential mechanism from wheels at opposite sides of the vehicle so that the rotational speed of the discs is proportional to the forward speed of the vehicle. A friction roller is in rolling contact with each of the rotated discs and drives a related axle or shaft extending radially with respect to the corresponding disc. Each friction roller is movable axially along the related shaft to vary the radial position or location on the disc at which the friction roller is disposed, and thereby to vary the rotational speed of the related shaft. Preferably, three friction rollers are provided to drive three shafts, with one shaft being adapted to actuate an altitude recording or registering device, while the other two shafts are adapted to actuate a conventional mechanism which records or registers the path of travel of the vehicle relative to a system of co-ordinates, for example, north-south and east-west. A gyroscopically controlled system is provided for radially adjusting the friction rollers which drive the shafts for actuating the course recording mechanism, and this system includes compensating means, which is preferably pendulum controlled, for taking into account the inclination of the vehicle at any time relative to the horizontal, particularly in the direction of travel of the vehicle. Further, the same pendulum is preferably employed for controlling the radial position of the friction roller which drives the altitude recording or registering device.

The foregoing, and other objects, features and advantages of the invention will be apparent in the following detailed description of an illustrative embodiment thereof which is to be read in connection with the accompanying drawings forming a part hereof and wherein:

Fig. 1 is a diagrammatic, vertical sectional view of a device for driving conventional mechanisms effective to record, register or plot the path of travel of a wheeled vehicle in accordance with the present invention and taken along a plane which is transverse to the direction of travel of the vehicle;

Fig. 2 is a diagrammatic, horizontal sectional view taken along the line 2—2 of Fig. 1; and Fig. 3 is a diagrammatic, perspective view of a conventional recording mechanism as used with the apparatus of the invention.

Referring to the drawings in detail, it will be seen that a device embodying the present invention includes three vertical axles 2, 3 and 4 which are rotatably journalled in a base plate 1 and respectively support discs 5, 6 and 7 having meshing toothed peripheries. The axles 2, 3 and 4 are vertically movable relative to base plate 1 and are urged upwardly, by suitable helical springs, against friction rollers 8, 9 and 10, respectively, to ensure adequate pressure between the discs and the friction rollers in rolling contact therewith.

Friction rollers 8 and 10 are rotatable about horizontal axes extending parallel to the direction of movement of the vehicle, while friction roller 9 is rotatable about a horizontal axis extending transverse to the direction of movement of the vehicle, and the axes of rotation of friction rollers 8, 9 and 10 intersect the axes of rotation of the related discs 5, 6 and 7.

One or more of verticle axles 2, 3 and 4 are connected by a suitable conventional mechanical transmission (not shown), to a wheel or wheels of the vehicle so that the axles 2, 3 and 4 and related discs 5, 6 and 7 are rotated at a speed proportional to the speed of the vehicle. The friction rollers 8, 9 and 10 are respectively keyed to shafts 11, 12 and 13 to rotatably drive the latter in response to rotation of discs 5, 6 and 7, and the friction rollers are movable axially along the related shafts 11, 12 and 13 to vary the radial distance from the point of contact of each friction roller with the related disc to the axis of rotation of the latter. Thus, the rotational speed of each of shafts 11, 12 and 13 and the direction of rotation thereof depends upon the rotation of the related one of discs 5, 6 and 7 and the axial position of the related friction roller 8, 9 and 10 with respect to the center of the corresponding disc.

The shafts 11, 12 and 13 are journalled in suitable bearings carried by an intermediate base 14 which is parallel to the base 1 and spaced upwardly from the latter. The shafts 11 and 12 are adapted to be connected by suitable mechanical means, for example, flexible shafts $F_1$ and $F_2$, respectively (see Fig. 3), to a conventional mechanism, generally identified by R, for recording, registering or plotting the path of travel of the vehicle with respect to a two-dimensional system of coordinates, while the shaft 13 is adapted to be similarly connected to a conventional mechanism (not shown) for recording or registering variations in the height or altitude of the vehicle as it moves along its recorded path of travel.

Friction roller 8 is embraced by a fork 15 depending from an element 17 which includes a slide 19 sliding in a groove or guide slot 20 formed in the intermediate base 14 and extending parallel to the axis of shaft 11, that is, in the direction of movement of the vehicle, and in the vertical plane passing through the axis of shaft 11. The element 17 further includes an elongated rod 21 disposed above intermediate base 14 and formed with a longitudinal slot 22 extending at right angles to the direction of guide slot 20.

Similarly, friction roller 9 is embraced by a fork 16 depending from an element 18 which includes a slide 23 sliding in a groove or guide slot 24 formed in the intermediate base 14 and extending perpendicular to the guide slot 20 in the vertical plane of the axis of shaft 12. The element 18 further includes an arm 25 extending from slide 23 above intermediate base 14 in the direction toward slot 20 and, at its free end, arm 25 carries an elongated rod 26 extending at right angles to slot 24 and formed with a longitudinal slot 27 (Fig. 2).

A vertical pin 29 which is guided by a gyro-compass, generally identified by the reference numeral 28, in the manner hereinafter described in detail, engages slidably in the slots 22 and 27 so that, as the pin 29 moves along the arcuate path shown in broken lines on Fig. 2, it effects axial displacement of friction rollers 8 and 9 in directions at right angles to each other to vary the rotational speeds of the related shafts 11 and 12 for driving the course recording mechanism. It is to be understood that the various described parts are dimensioned so that, when the associated vehicle is heading due north, as indicated or sensed by the gyro-compass 28, roller 8 is disposed on the axis of rotation of disc 5 and hence is at rest, while roller 9 is disposed near the periphery of disc 6 and rotated to record movement in the north-south direction with no component of motion in the east-west direction.

The pin 29 is mounted at the end of a plunger 47 which telescopes in a hollow arm 30. The arm 30 extends radially from the lower end of a vertical, hollow cylinder 32 which is rotatably mounted in an upper plate member 31 extending parallel to intermediate base 14 and spaced upwardly from the latter. As seen in Fig. 2, the axis of cylinder 32 passes through the intersection of the axes of rotation of shafts 11 and 12. Suitable supports or columns extend between bases 1 and 14 and plate member 31 to maintain such parts in their desired parallel and spaced apart relationship. A gear 33 is fixed on rotatable cylinder 32 above plate member 31 and meshes with a gear 34 which is carried by a vertical shaft 35 journalled in plate member 31. The casing 36 of gyro-compass 28 is fixed on gear 34 and rotates with the latter, and the gyro-compass is connected to a conventional electric control and switching mechanism, illustrated schematically and generally identified by reference numeral 37, for controlling a reversible electric motor 38 which, through a worm (not shown), drives a worm gear 39 fixed on the shaft 35. The mechanism 37 merely serves to control the motor 38 so that the gear 34 will rotate relative to plate member 31 and the vehicle to maintain an initial angular relationship with respect to the gyro-compass 28 as the vehicle changes its course. Thus, changes in the course of the vehicle are communicated through gears 33 and 34, cylinder 32, arm 30 and plunger 47 to the pin 29 to cause swinging of the latter for varying the radial positions of friction rollers 8 and 9 on the respective rotated discs 5 and 6.

Since the distance travelled by the associated vehicle in moving up and down hills or grades is greater than the horizontal component of that distance which is to be registered or recorded, the device embodying the present invention includes compensating means which comprises a standard or support 40 mounted on plate member 31 and having an axle or shaft 41 journalled therein for rotation about a horizontal axis extending transversely with respect to the direction of movement of the vehicle. A pendulum or weight 42 is mounted at one end of shaft 41 to cause angular displacement of the latter relative to support 40 in response to inclination of the vehicle from the horizontal. An arm 43 extends radially from the end of shaft 41 opposite to pendulum 42 and is pivotally connected to one end of a connecting rod 44 which, at its other end, is pivotally connected to a piston 45 which is vertically reciprocable within hollow cylinder 32 to act upon hydraulic fluid 46 therebelow. A suitable passage connects the interior of cylinder 32 to the interior of arm 30 so that the fluid 46 can act upon the plunger 47 to more or less extend the latter in response to vertical movement of piston 45. Thus, changes in the inclination of the vehicle serve to vary the radius R (Fig. 2) of the curved path of pin 29 and compensation for such inclination is obtained to achieve an accurate two-dimensional record of the course followed by the vehicle.

Further, shaft 41, which is angularly actuated by pendulum 42, also actuates, through bevel gears 48, a vertical rotatable shaft having a radial arm 49 extending therefrom. Arm 49 carries a pin 50 at its free end to engage in an elongated slot 51 formed in a rod 52 extending transversely from a slide 53 which engages slidably in a guide slot 54 formed in intermediate base 14 in the vertical plane of shaft 13. A fork 55 depends from slide 53 and embraces roller 10 to effect axial movement of the latter toward and away from the axis of rotation of disc 7 in response to movement of slide 53 along guide slot 54. It is to be understood that the parts described above are dimensioned so that, when the vehicle is horizontal, pendulum 42 causes pin 50 to assume a position disposing roller 10 at the center of disc 7. Thus, when the vehicle is horizontal, no rotation of roller 10 and shaft 13 is effected and the associated recording device will show no change in the elevation or altitude of the vehicle. However, when the vehicle is inclined, pin 50 is swung along an arcuate path shown in broken lines on Fig. 2, to displace roller 10 away from the center of disc 7 so that the shaft 13 is rotated at a speed dependent upon the extent of such displacement (proportional to vehicle inclination) and the rotational speed of disc 7 (proportional to vehicle speed), and the associated recording device will then indicate the changes in elevation or altitude. It is advantageous to install all the moving parts of the apparatus in such a way as to keep the frictional loss as low as possible.

The invention in question proves useful for various purposes. For instance, it enables any motorcar driver driving on long distances, especially at night time, to find out the location of his vehicle. Furthermore the apparatus in question will prove useful for checking and controlling by various carriers as equipment on their long distance trucks and the like. Other possibilities of use are for expeditions or tours in completely unknown regions.

While a particular embodiment of the invention has been described in detail and illustrated in the accompanying drawings, it is to be understood that the present invention is not limited to that precise embodiment, and that various changes and modifications may be effected therein without departing from the scope or spirit of the invention as defined in the appended claims.

What is claimed is:

1. In apparatus for recording the path of travel of an associated vehicle with reference to a system of ordinates and coordinates on a flat plane; the combination of first and second discs adapted to be rotationally driven at speeds proportional to the speed of an associated vehicle, first and second friction rollers in contact with said first and second discs, respectively, and rotatable about axes extending radially from the axes of rotation of the related discs, the axes of rotation of said first and second friction rollers being normal to each other and said first and second friction rollers being movable axially toward and away from the axes of rotation of the related discs, first and second longitudinally slotted members extending transversely with respect to the axes of rotation of said first and second friction rollers, respectively, said first and second longitudinally slotted members being connected to said first and second friction rollers, respectively, for movement with the latter in the directions of the axes of rotation of said first and second friction rollers, respectively, a pin extending slidably in said first and second longitudinally slotted members, means supporting said pin for swinging about an axis which is spaced radially from said pin and passes through the intersection of said normal axes of rotation of said first and second friction rollers, gyro-compass actuated means operative to angularly displace said supporting means and swing said pin from a position lying in a vertical plane passing through the axis of rotation of one of said first and second friction rollers in response to departure of the associated vehicle from a datum direction so that said first and second friction rollers are thereby displaced axially toward and away from the axes of rotation of the related discs and the rotational speeds of said first and second rollers correspond to the components of the travel of the associated vehicle in directions parallel and normal to said datum direction, and means acting in response to the inclination of the associated vehicle from the horizontal to modify the positions of said first and second friction rollers radially from the axes of rotation of the related discs so that the rotational speeds of said first and second friction rollers are proportional to the horizontal projections of the components of travel in said directions parallel and normal to the datum direction.

2. In apparatus for recording the path of travel of an associated vehicle with reference to a system of ordinates and coordinates on a flat plane; the combination according to claim 1, further comprising a third disc adapted to be rotatably driven at a speed of travel of the associated vehicle, a third friction roller in rolling contact with said third disc and rotatable about an axis extending radially from the axis of rotation of said third disc, said third friction roller being movable axially toward and away from the axis of rotation of said third disc, and means acting in response to the inclination of the associated vehicle from the horizontal to displace said third friction roller toward and away from said axis of rotation of the third disc so that the rotational speed of said third friction roller is proportional to the rate of change of elevation of the associated vehicle.

3. In apparatus for recording the path of travel of an associated vehicle with reference to a system of ordinates and coordinates on a flat plane; the combination according to claim 1, wherein said means supporting the pin includes a radially extensible and contractible arm, and said means acting in response to inclination from the horizontal of the associated vehicle includes a support standard, a pendulum swingably mounted on said standard, and means actuated by swinging of said pendulum relative to said standard to effect radial contraction and extension of said arm to vary the swinging radius of said pin.

4. In apparatus for recording the path of travel of an associated vehicle with reference to a system of ordinates and coordinates on a flat plane; the combination according to claim 3, further comprising a third disc adapted to be rotatably driven at a speed proportional to the speed of travel of the associated vehicle, a third friction roller in rolling contact with said third disc and rotatable about an axis passing radially through the axis of rotation of the third disc, and means driven by said pendulum operative in response to swinging of the latter relative to said standard to displace said third roller axially toward and away from said axis of the third disc so that the rotational speed of said third friction roller is proportional to the rate of change of elevation of the associated vehicle.

References Cited in the file of this patent

UNITED STATES PATENTS

| | | |
|---|---|---|
| 536,906 | Aramburn | Apr. 2, 1895 |
| 2,337,044 | Holmes | Dec. 21, 1943 |
| 2,395,351 | Sohn | Feb. 19, 1946 |